United States Patent
Manteghi

(10) Patent No.: US 10,097,217 B2
(45) Date of Patent: Oct. 9, 2018

(54) TRANSMITTING WIDEBAND SIGNALS THROUGH AN ELECTRICALLY SMALL ANTENNA USING ANTENNA MODULATION

(71) Applicant: Virginia Tech Intellectual Properties, Inc., Blacksburg, VA (US)

(72) Inventor: Majid Manteghi, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 15/529,129

(22) PCT Filed: Nov. 20, 2015

(86) PCT No.: PCT/US2015/061972
§ 371 (c)(1),
(2) Date: May 24, 2017

(87) PCT Pub. No.: WO2016/081894
PCT Pub. Date: May 26, 2016

(65) Prior Publication Data
US 2017/0279471 A1    Sep. 28, 2017

Related U.S. Application Data

(60) Provisional application No. 62/101,604, filed on Jan. 9, 2015, provisional application No. 62/082,952, filed on Nov. 21, 2014.

(51) Int. Cl.
*H04B 1/04* (2006.01)
*H01Q 9/06* (2006.01)
*H04B 5/00* (2006.01)

(52) U.S. Cl.
CPC ............. *H04B 1/04* (2013.01); *H01Q 9/06* (2013.01); *H04B 5/0037* (2013.01)

(58) Field of Classification Search
CPC ................... H04B 1/18; H01Q 9/145
USPC ......... 455/121, 193.1, 107; 343/745
See application file for complete search history.

(56) References Cited

U.S. PATENT DOCUMENTS

| | | | |
|---|---|---|---|
| 5,404,114 A | 4/1995 | Sager | |
| 7,786,869 B2 * | 8/2010 | Yamada | G06K 19/0701 340/10.6 |
| 8,073,894 B1 | 12/2011 | Dasgupta et al. | |
| 8,514,965 B2 * | 8/2013 | Christensen | H04B 5/00 327/551 |
| 8,781,522 B2 * | 7/2014 | Tran | H01Q 1/22 343/745 |

(Continued)

OTHER PUBLICATIONS

United States International Searching Authority; International Search Report & Written Opinion for PCT/US2015/061972; dated Feb. 5, 2016; 9 pages; Alexandria, VA; US.

*Primary Examiner* — Sonny Trinh
(74) *Attorney, Agent, or Firm* — Keith A. Vogt; Vogt IP

(57) ABSTRACT

The present invention provides methods and devices to radiate wideband signals. The devices may include a tunable high Q narrowband antenna having a plurality of ports including a feed port and a tuning port as well as a tuning element coupled to the tuning port of the antenna. One or more voltage sources supply energy for radiating a radio frequency signal. A modulating signal generator may also be provided for generating a high data rate signal coupled at the tuning element for modulating the tuning element.

20 Claims, 11 Drawing Sheets

(56) References Cited

U.S. PATENT DOCUMENTS

| | | | |
|---|---|---|---|
| 8,909,182 B2 * | 12/2014 | Milosevic | H01Q 1/242 |
| | | | 343/745 |
| 8,948,707 B2 * | 2/2015 | Mach | H04B 1/0458 |
| | | | 333/126 |
| 2007/0217637 A1 | 9/2007 | Haenggi et al. | |
| 2008/0238679 A1 | 10/2008 | Rofougaran et al. | |
| 2008/0305750 A1 * | 12/2008 | Alon | H01Q 9/0442 |
| | | | 455/77 |
| 2010/0207572 A1 | 8/2010 | Kirby et al. | |

* cited by examiner

TRANSMITTING WIDEBAND SIGNALS THROUGH AN ELECTRICALLY SMALL ANTENNA USING ANTENNA MODULATION

RELATED APPLICATIONS

This application claims the benefit of U.S. Provisional Application No. 62/000,000 filed on Nov. 21, 2014 and entitled "Transmitting Wideband Signal through an Electronically Small Antenna Using Antenna Modulation" and herein incorporated by reference.

BACKGROUND OF THE INVENTION

Electrically small antennas are known for having narrow bandwidths. Based on the fundamental limits of antennas, the quality factor of a small antenna, which is related to its bandwidth, has a minimum tied to its electrical size. The minimum quality factor, Q, of an antenna cannot be smaller than $1/(ka)^3$ where the antenna is enclosed by a sphere of radius "$\alpha$" and the operating frequency is the speed of light multiplied by k divided by $2\pi$. In this equation, k represents the wave number. Q can be related to the bandwidth for any narrowband component as the ratio of the center frequency divided by 3 dB bandwidth. The lower the Q, the wider the rational bandwidth.

A high quality factor, which is equivalent to a narrow bandwidth, means the device or the antenna does not permit fast variation. This means that the rate of information passed through the device (radiated by the antenna) is limited. Based on the Linear Time-Invariant (LTI) for systems and circuits, there is no way to radiate a high data rate signal from an antenna with a small electrical size.

In general, a small antenna is also considered to be a leaky LC resonator which means that the antenna behavior is severely affected by its resonance nature. The ohmic loss associated with both a less than ideal inductor and capacitor can be added to the radiation resistance due to leakage. The impurity of L and C can also be considered in the efficiency calculation. There are three types of small antennas: (1) lumped capacitor connected to a leaky inductor (equivalent to a magnetic dipole); (2) lumped inductor connected to a leaky capacitor (equivalent to an electric dipole) and (3) leaky inductor connected to a leaky capacitor (a combination of electric and magnetic dipoles)

The type 1 antennas are a magnetic antenna and has dominant magnetic field and stored magnetic energy in its near zone. The type 2 antenna an electric antenna and has dominant electric field and stored electric energy in its near zone. A type 3 antenna is a combination of types 1 and 2 and the near zone field can be any combination of electric and magnetic fields.

Thus, there is a need to design an antenna that exceeds theoretical limits.

BRIEF SUMMARY OF THE INVENTION

In one embodiment, the present invention concerns an electrically small antenna that radiates a wideband high data rate signal and overcomes the theoretical limits by modulating the antenna structure.

In other embodiments, the present invention provides an antenna topology in addition to its feeding mechanism, that allows the small antenna to transmit a wideband signal. Since a small antenna is considered to be a leaky RLC resonator in which R represents the total loss (ohmic and radiation losses), the voltage across the capacitor may be changed faster than the rate dictated by the quality factor of the resonator by pumping or damping charges from at least one capacitor to realize an arbitrary waveform.

In other embodiments, the present invention provides a tunable antenna. The tunability may be applied to frequency, phase, and/or magnitude of the transfer function of the antenna. If the parameters of a tunable antenna change over time, the transfer function of the antenna is changed. Consequently, the characteristics of the radiated signal are changed as well. In this manner, information may be transmitted by modulating the tunable antenna. As a result, the bandwidth or data rate of the antenna is not limited by the fundamental limits of the antenna. Therefore, a high data rate signal may be transmitted by an electrically small antenna.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1:
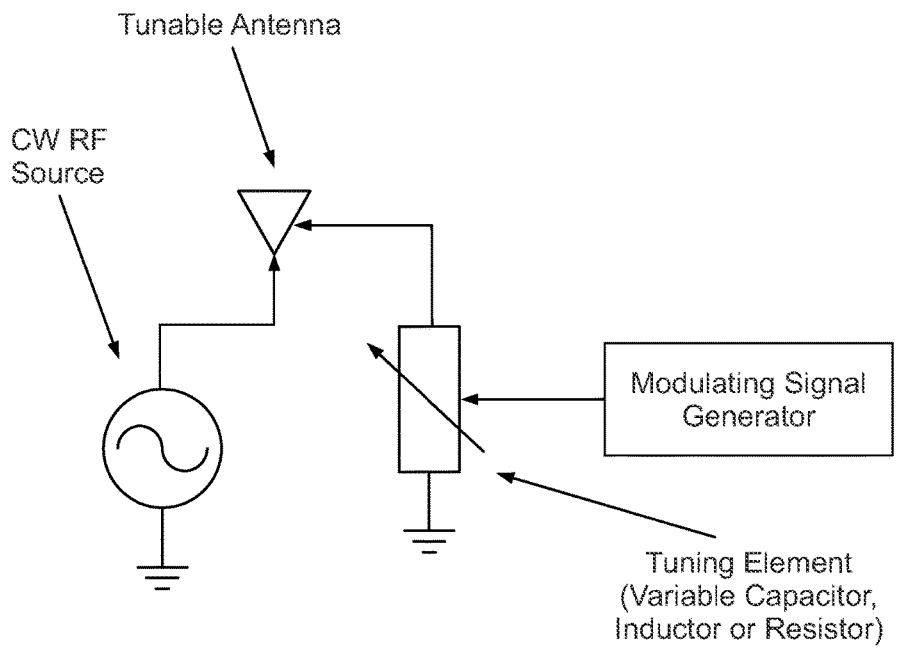
FIG. 1 illustrates a tunable antenna in accordance with an embodiment of the present invention.
Figure 2:
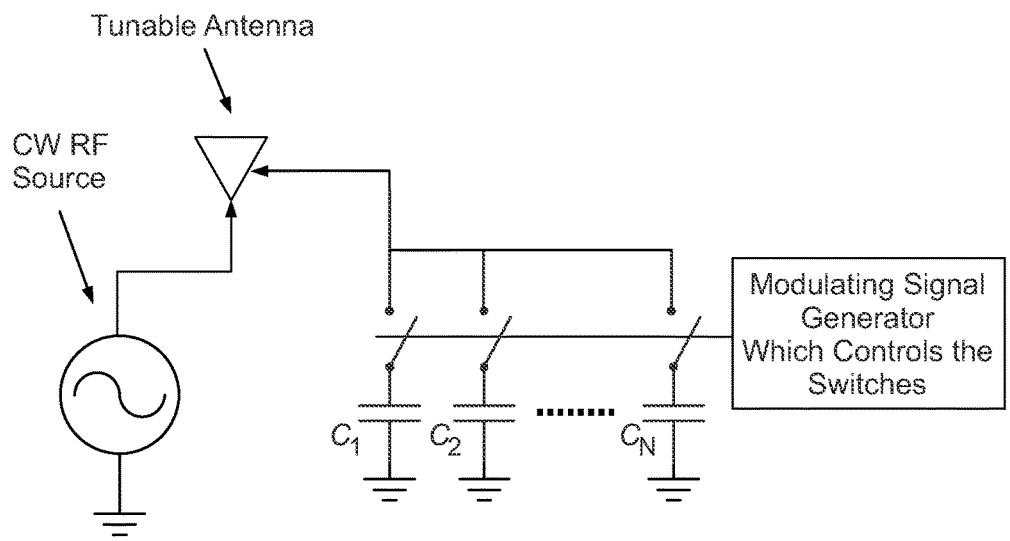
FIG. 2 illustrates another tunable antenna in accordance with an embodiment of the present invention.

The present invention, in certain aspects, concerns embodiments that modulate components of an antenna to radiate high data rate signals through an electrically small antenna. As shown in FIGS. 1 and 2, the present invention, for some embodiments, provides a radio frequency, RF, source connected to an antenna that generates a constant wave, CW, signal. The information is transmitted by modulating the frequency, phase and/or magnitude of the transfer function of the antenna by the desired data. The modulation scheme may be a sudden change between different states. As a result, the radiated signal may be modulated as FSK (frequency shift keying), PSK (phase shift keying), or ASK (amplitude shift keying) depending on the type of modulation of the frequency, phase or magnitude of the transfer function, respectively. The modulating signals are switchable between two different states. The signals may also be switched between many different states based on the application. For example, if the tuning element modulates the frequency of the antenna and switches between two frequencies, it generates an FSK signal. On the other hand, if it switches between many different values to modulate the frequency, a spread spectrum or a wideband signal is generated.

There are various ways to produce one or more sudden variations in an antenna. In one embodiment, a switch bank may be used. The switch bank may be connected to multiple components (for example capacitors) and may further be used to switch as many as components as is required to shift the resonant frequency (phase or magnitude) of the antenna to a particular value. This may be done over time or at once. The combination may then be changed to switch the antenna to a different state.

In other embodiments, the radio frequency, RF, source connected to the antenna generates a constant wave, CW, signal and the information is transmitted by modulating the frequency, phase and/or magnitude of the transfer function of the antenna by the desired data. The modulation may continuously change between different states. The radiated signal may be modulated as FM (frequency modulation), PM (different phase modulations), or AM (amplitude modulation) and depends on the type of modulation on the frequency, phase or magnitude of the transfer function, respectively.

Figure 3:
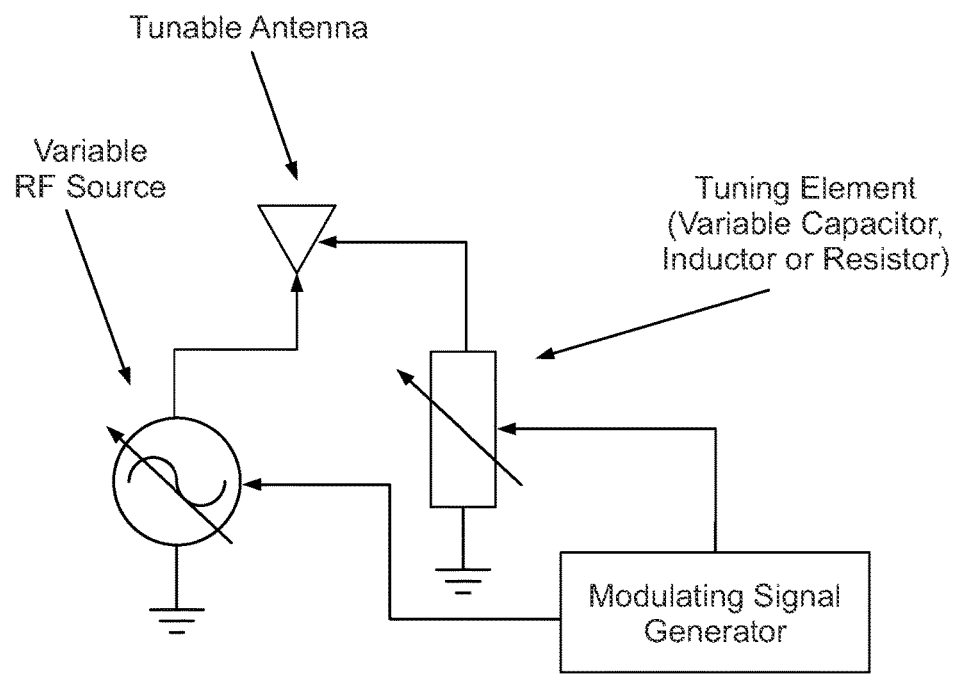
FIG. 3 illustrates yet another tunable antenna in accordance with an embodiment of the present invention.

In other embodiments, as shown in FIG. 3, the radio frequency source connected to the antenna generates a time-varying signal which is modulated (with means of frequency, phase and magnitude) by the desired information and simultaneously the antenna transfer function is modulated (with means of frequency, phase and magnitude) to be able to radiate the modulated signal from the source.

In other embodiments, the modulation of the signal and antenna may be coordinated to transmit a desired waveform associated with the desired information to the receiver. Since both the signal and the antenna are modulated, there system has additional flexibility. This allows the system to radiate spread spectrum signals and ultra-wideband signals through a small antenna. A modulating unit may also be used to convert the baseband data to a control signal to tune the antenna and the RF source. The system may also include a processing unit as well as other required components such as memory, analog to digital converters and digital to analog converters.

Figure 4:
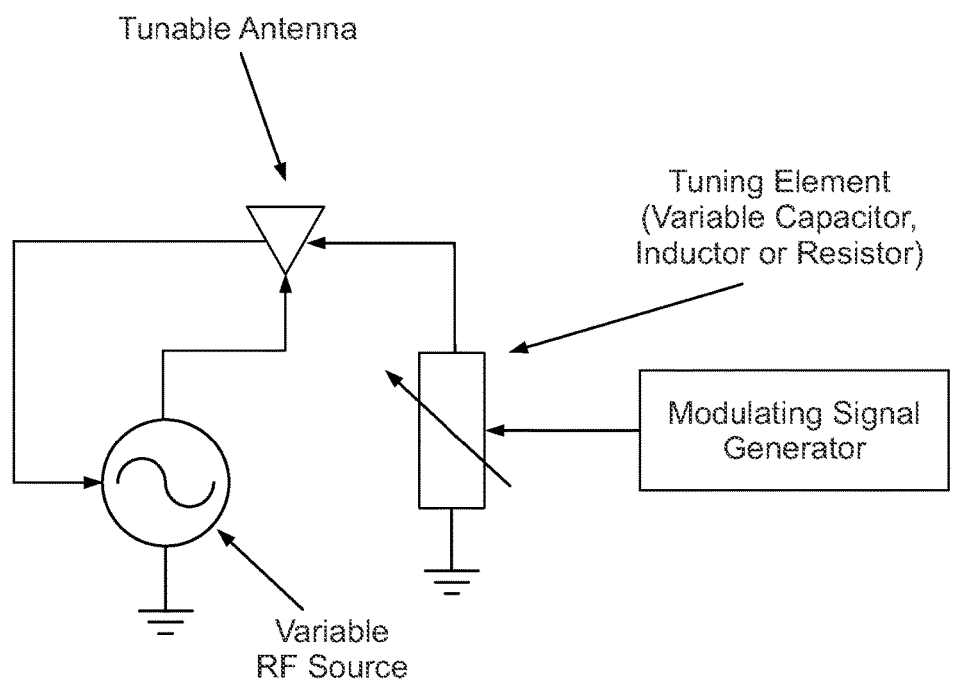
FIG. 4 illustrates a further tunable antenna in accordance with an embodiment of the present invention.

In other embodiments, as shown in FIG. 4, the tunable antenna may be included in the RF source structure as a resonant component. In this embodiment, the antenna is part of the oscillator and changing the antenna parameters changes the oscillator characteristics (frequency, phase and magnitude of the generated signal). For this embodiment, the modulating unit (or the control unit) controls the antenna and the oscillator follows the implemented changes. Since the antenna is a narrowband structure, it may be used in the oscillator architecture as the resonant structure. As a result, the resonant frequency of the oscillator depends of the resonant frequency of the antenna. This technique may be used for both digital modulations with multiple frequencies or it may be used for analog modulation when the resonant frequency of the antenna changes to radiate an analog modulated signal.

Figure 5:
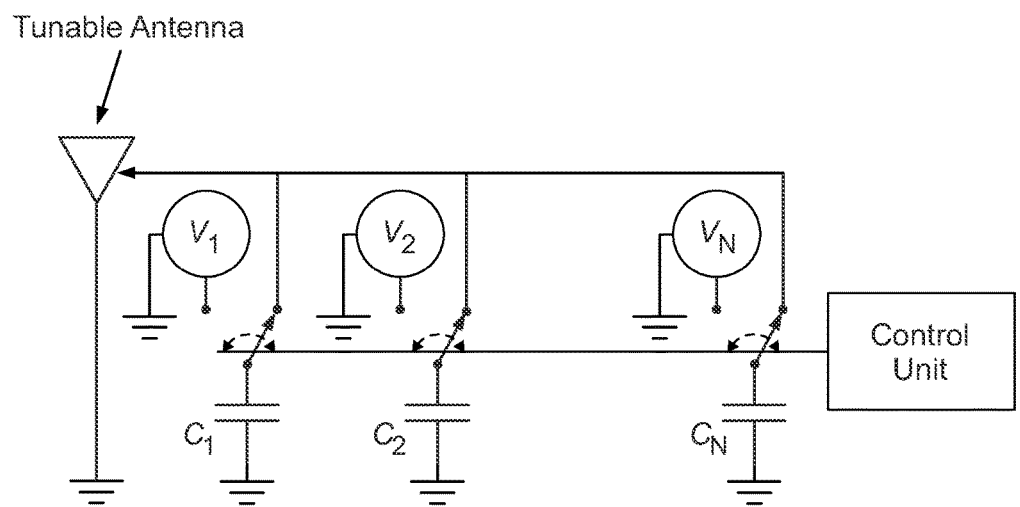
FIG. 5 illustrates an additional tunable antenna in accordance with an embodiment of the present invention.

For another embodiment of the present invention, as shown in FIG. 5, there is no RF source and the transient properties the antenna create the radiated signal in the radio frequency range. One method of accomplishing this is to deliver power through one or more reactive components to a tunable antenna and simultaneously modulate the frequency of the antenna. For example, in a narrowband antenna tuned by an external capacitor, energy may be injected into the antenna through its tuning port by the capacitor. At the same time, the capacitor modulates the antenna resonant frequency.

A switch may be used to connect the antenna tuning port to a voltage source, such as a DC source and to one or more capacitors. The voltage source charges one or more capacitors when the switch is connected between the voltage source (e.g., a battery) and the capacitors. The switch may then disconnect the one or more capacitors from the power source and connect the one or more capacitors to the tuning port of the antenna. In this manner, the antenna is modulated and fed simultaneously.

In yet another embodiment, multiple capacitors may be connected to different voltage sources switched to the tuning port of the tunable antenna in a predetermined sequence or sequences to create a spread spectrum signal. The capacitors may connect to the same voltage source or they may connect to individual voltage sources. Every time a capacitor connects to the antenna, it delivers power to the antenna in form of a charge packet and tunes the antenna to a specific frequency associated or assigned to the capacitor. The capacitor may stay connected to the antenna for multiple cycles of the tuned frequency associated with the capacitor. When the capacitor is switched off, the antenna may ring in a free running state with its original resonant frequency or, at the time a capacitor is disconnected from the antenna, another capacitor connects and performs a similar function as the prior capacitor. In a preferred embodiment, the subsequent capacitor operates at a different frequency than the prior capacitor. This modulation scheme may continue with different capacitors, or it may revert to a predetermined capacitor.

The number of capacitors plus one decides the number of frequencies that the antenna can generate. A system including a plurality of capacitors and their voltage sources, in addition to their switch and the tunable narrowband antenna, create a transmitter including an antenna which is able to radiate a sequence of frequencies as a spread spectrum signal. The control unit converts the baseband data to a switching sequence and applies the required control signal to each switch when it is needed. The control unit contains a processor and multiple output as a multiplexer to control all the switches.

Figure 6:
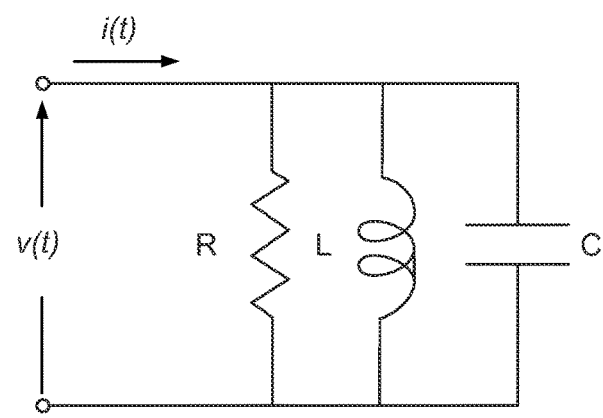
FIG. 6 illustrates a RLC model for small antennas in accordance with an embodiment of the present invention.

In other embodiments, the present invention provides a wideband resonator using a circuit model for small antennas for which a circuit model would be an RLC resonator as shown in FIG. 6. The resonant frequency, damping factor, and quality factor of an RLC resonator is calculated by:

$$\omega_0 = \frac{1}{\sqrt{LC}}, \alpha = \frac{1}{2RC}, Q = R\sqrt{\frac{C}{L}}$$

If the resonator is excited by a charge pump and charges the capacitor to voltage Vo, the voltage over the resistor can be computed as:

$$v(t) = V_0 e^{-\alpha t} \cos \omega_0 t\, U(t)$$

where U(t) is the unit step function. The waveform is depicted in FIG. 7.

Figure 8:
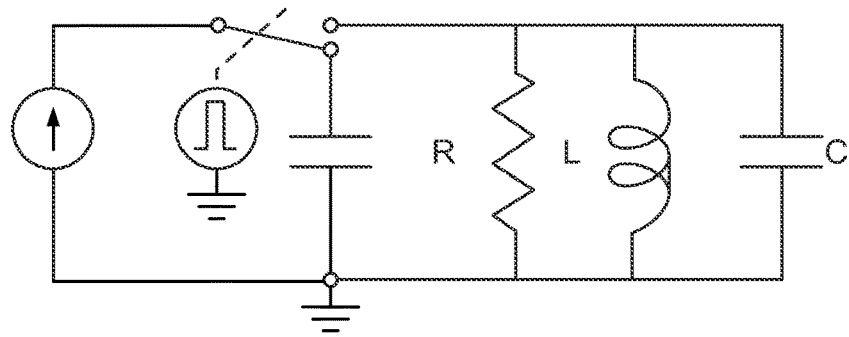
FIG. 8 shows the RLC resonator excited with a switched charge pump for an embodiment of the present invention.

In another embodiment, the present invention provides a charge packet to the capacitor when the voltage drops below a threshold or charges the capacitor periodically with the same frequency as the resonance frequency of the resonator. The charge may be pumped into the capacitor while the capacitor is in its charging state (the voltage across the capacitor is increasing). FIG. 8 shows a schematic for this circuit.

Figure 7:
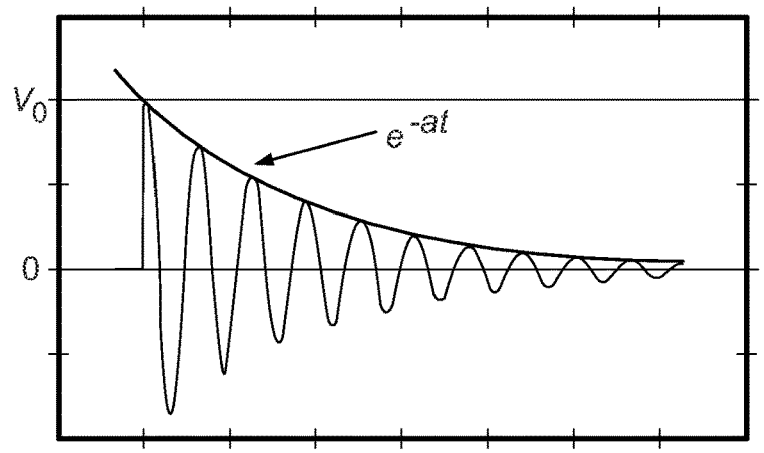
FIG. 7 illustrates that the voltage across the resistor is a damped sinusoidal for an embodiment of the present invention.
Figure 9:
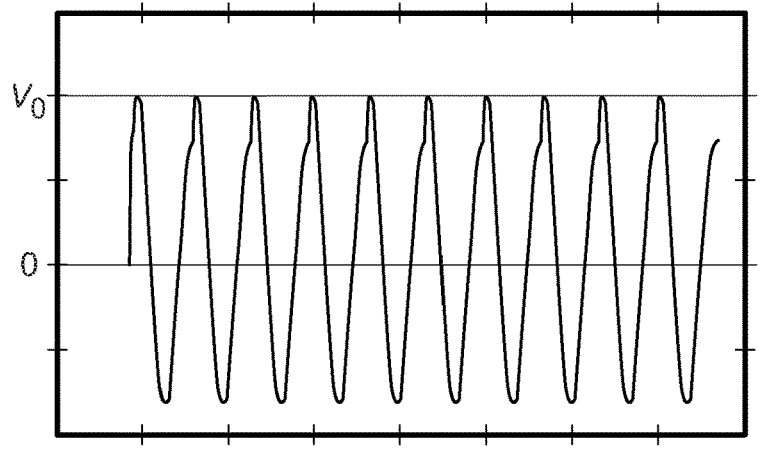
FIG. 9 illustrates the waveform of the periodically charge-pumped RLC resonator shown in FIG. 8.

The damping factor for FIGS. 7 and 9 were considered to be high (wideband resonator) to show the procedure. A narrowband resonator has a higher quality factor and the dropped voltage would be much smaller. As a result, the output waveform may look like a pure sinusoidal wave.

Figure 10A:
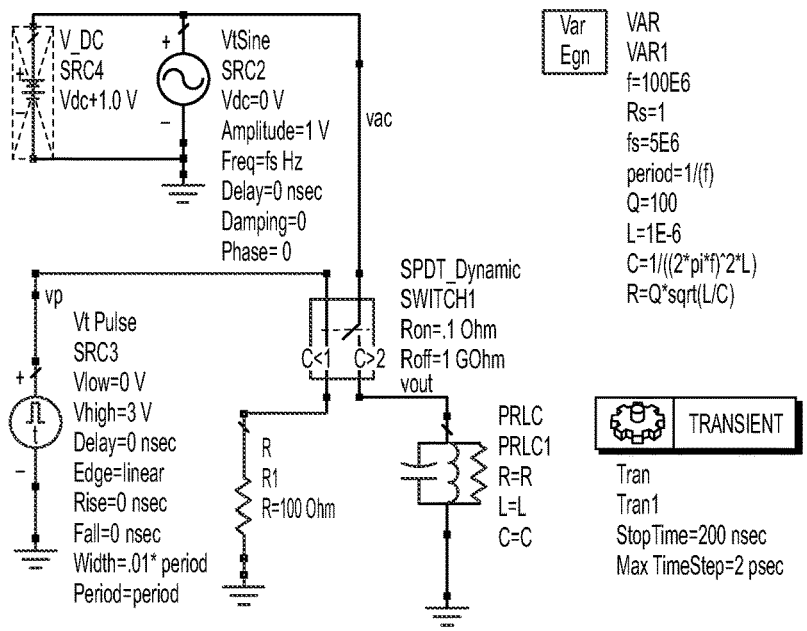
FIGS. 10A, 10B and 10C: (A) Advanced Design System (ADS) transient simulation for an RLC resonator tuned at 100 MHz and quality factor of 100 for an embodiment of the present invention. (B) Impulse response of the RLC resonator. (C) A double-sideband 10 MHz modulated signal across the resistor (quality factor of the signal is 5 which is 20 times wider than the bandwidth of the resonator).
Figure 10B:
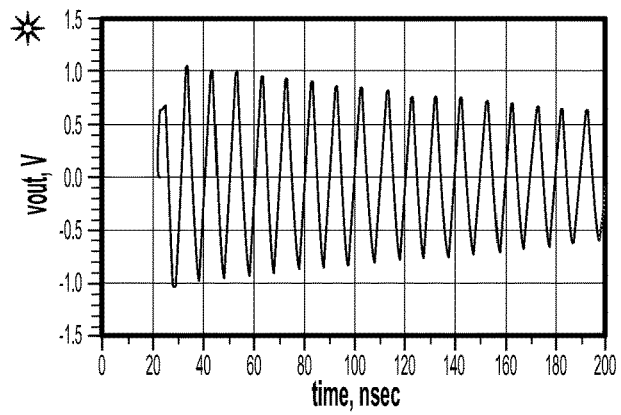
Figure 10C:
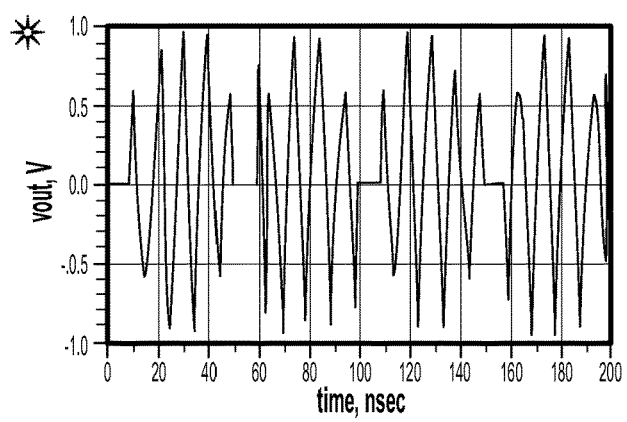

In yet other aspects, the present invention provides charge-pump circuitry to control the charging and discharging of the capacitor. The circuitry may be configured to use an arbitrary value to drive the antenna from one or more capacitors rather than from a radio frequency source. The waveform of the voltage across the resistor would follow the charge pumped or discharged from the capacitor by an increase or decrease in the values of $\Delta V_n = Q_n/C$, where C is the capacitance, Q, is the total charge (it could be + or −) pumped to the capacitor at each stage. Operating the antenna in this manner may reduce harmonics by performing charging when the voltage is increasing across the capacitor and discharging during the time that the voltage is decreasing across the capacitor. In this manner, an arbitrary waveform may be created across the resistor in an RLC resonator regardless of the high quality factor of the resonator. An example has been simulated by ADS and the results are shown in FIG. 10.

A voltage source with zero impedance has been used for the simulation to charge and discharge the capacitor to a given voltage at each period. This shows that a high Q does not limit the waveform of the voltage across the resistor. In other embodiments, a charge-pump may be used as the voltage source.

Figure 11:
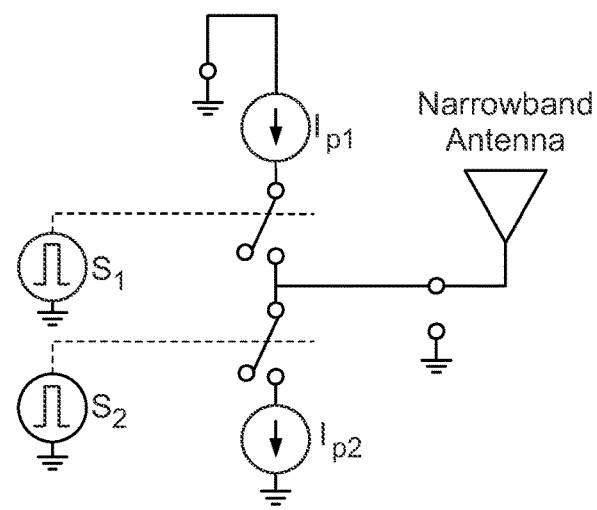
FIG. 11 illustrates two sources pump or drain charges from the antenna shaping its radiating waveform for an embodiment of the present invention.

In other embodiments, the present invention concerns transmitting wideband signals by a narrowband antenna. In a specific embodiment, charges may be pumped to one or more capacitors in the antenna resonance structure. The resonator is then allowed to go through free running oscillations. The magnitude of the oscillation can be controlled by adding or subtracting charges. FIG. 11 provides a schematic for this embodiment.

In yet other embodiments, the present invention provides various architectures or options to control the waveform. An objective of the present invention is to provide the necessary $\Delta V_n$ at a proper time (positive changes when the voltage across the capacitor is rising and negative changes when the voltage across the capacitor is decreasing) to increase or decrease the voltage according to a desired signal to shape a radiating waveform. The total desired charge pumped to or drained from the capacitor at the $n^{th}$ occasion is calculated as:

$$Q_n = C\Delta V_n$$

at the same time Q, is computed as:

$$Q_n = \int_{t_n}^{t_n+T_n} I_p(t)\, dt$$

Figure 12A:
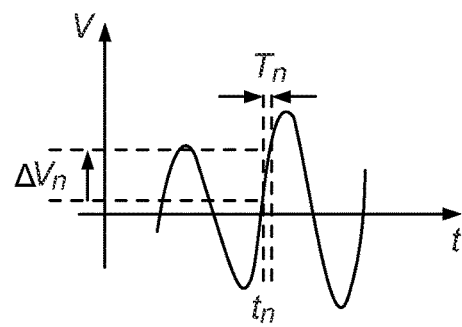
FIGS. 12A-12B: show the amplitude of the sinusoidal changes by $\Delta V_n$, at $t_n$, for an embodiment of the present invention. (A) Step up and (B) step down cases.
Figure 12B:
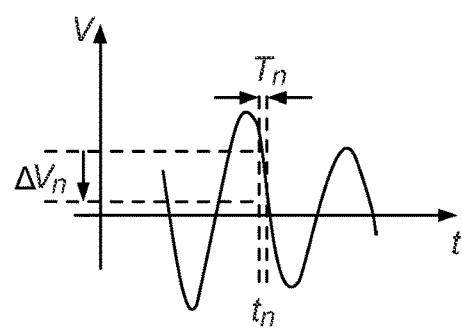

To provide a desired voltage change, $\Delta V_n$, the switched ON time-window, $T_n$, may be kept constant and changes are made to the magnitude of the current source $I_p$ ($T_n$). In another embodiment, the present invention keeps the current constant and changes the $T_n$, (similar to pulse width modulation, PWM). FIGS. 12A and 12B show the charge pump or charge drain from the resonator and realize desired $\Delta V_n$.

FIGS. 12A and 12B illustrate how two different current sources may be switched to the antenna (the current is pumped to or drained from the port across the capacitor). The required voltage amplitude change $\Delta V_n$, is realized by the two current sources with a proper amplitude, $I_n$, and switched ON time-window, $T_n$. The switches are controlled by two pulse generators $S_1$ and $S_2$, which may be different.

Figure 13:
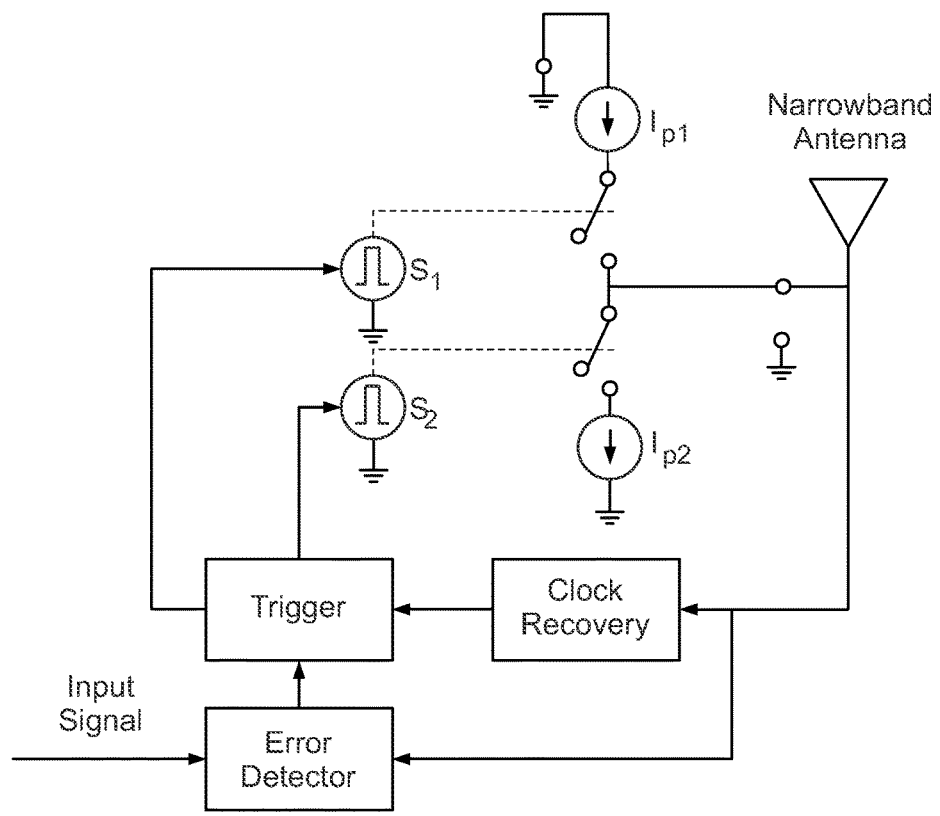
FIG. 13 illustrates a design for a charged pumped antenna in accordance with an embodiment of the present invention.
Figure 14:
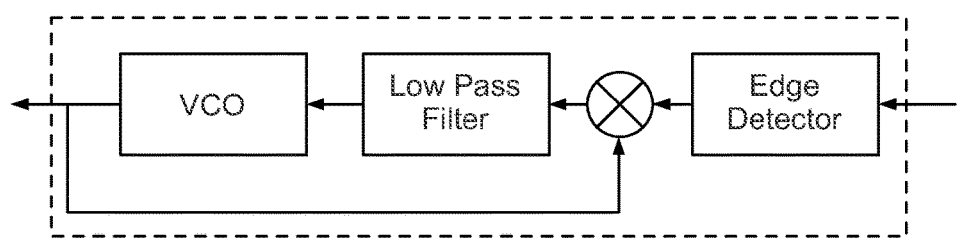
FIG. 14 illustrates a typical clock recovery circuitry for an embodiment of the present invention.
Figure 15A:
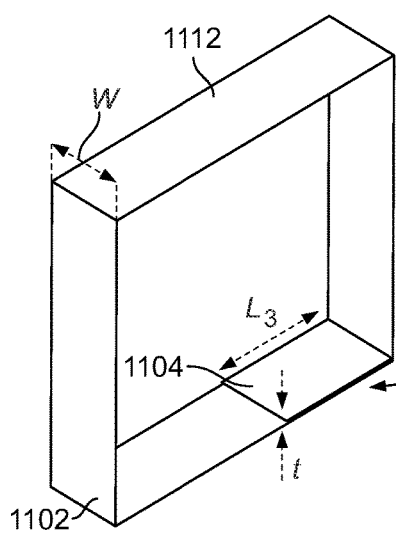
FIGS. 15A, 15B and 15C: illustrate a distributed LC resonator. (A) 3D view, (B) side view, (C) capacitor and the port.
Figure 15B:
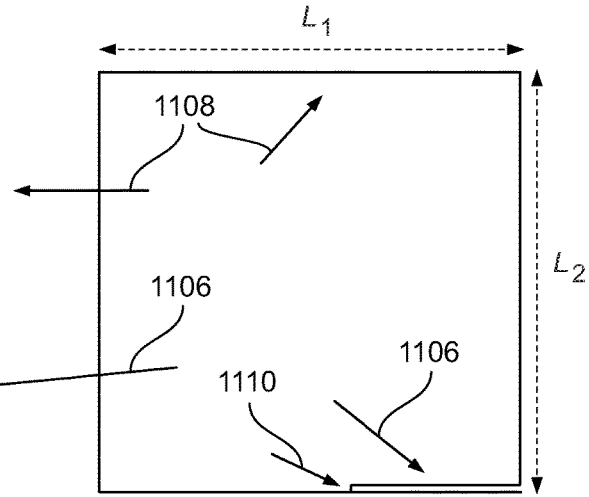
Figure 15C:
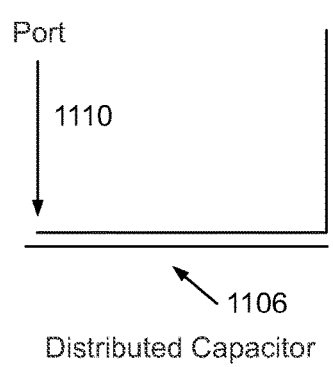

Based on the timing shown in FIGS. 12A and 12B, $S_1$ and $S_2$ may be synchronized to the sinusoidal signal radiated from the antenna. Therefore, a PLL is needed for clock recovery, an embodiment of which is shown in FIG. 13.

In this embodiment, the present invention provides a clock recovery PLL, switching signal generators, and a charged pumped antenna. The input signal is compared to the voltage at the antenna port and, if the voltage at the antenna port needs to be changed ($\pm\Delta V$), trigger circuitry generates a proper switching command so that the desired current source is used to pump or drain charges from the capacitor in the antenna structure to adjust the voltage. The clock recovery PLL may use a current controlled oscillator, CCO, and charge pumps instead of a voltage controlled oscillator, VCO, to minimize constant phase error. The waveform at the antenna port is sampled by the clock recovery PLL to generate a synchronized switching signal. An error detector compares the switching signal with the input signal. If the input signal begins to rise, the error detector will detect the difference and cause the trigger circuitry to switch $S_1$ to the ON state and charge the capacitor in the antenna structure with a given amount of charge. A feedback system may be configured in this manner so that the loop system stays stable.

In yet other embodiments, the present invention provides a leaky LC resonator 1100 as shown in FIGS. 15A-15D. For this embodiment, a metallic band 1102 may form a square or some other enclosed structure and the last part of the band has an overlap portion 1104 to shape a distributed capacitor 1106. A port 1110 is also provided.

Wide strip 1112 allows low ohmic loss and distributed capacitor 1106 provides a high Q resonance. The structure may be fed across the capacitor.

The structure has been simulated using HFSS (High Frequency Structure Simulator) for dimensions: $L_1=L_2=30$ mm, $L_3=12$ mm, $W=7$ mm, $t=0.1$ mm. The capacitance and inductance are designed to have a resonance at $f_0=178$ MHz. The antenna size at this frequency is $L_1=0.0178\lambda$, which is considered to be an extremely small antenna.

Based on fundamental limits, the minimum quality factor of an antenna with this size is $Q_{min}=2000$ which can be translated to an 88 KHz bandwidth for a lossless case (although in practical application the ohmic loss reduces the Q). A short dipole has been added to the simulation as electric field probe. The length of the short dipole is 30 mm which is located 20 cm above the loop antenna and it is connected to a large resistance to measure the open circuited voltage across the probe antenna.

Figure 16:
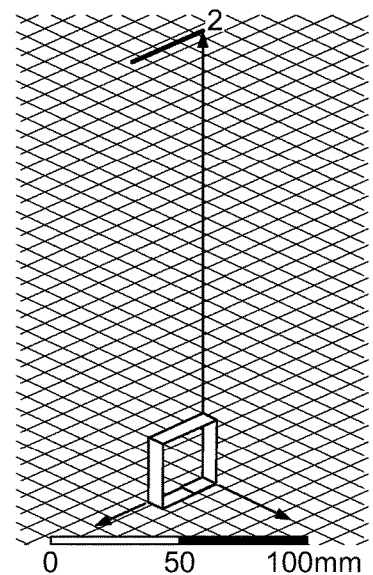
FIG. 16 illustrates a High Frequency Structure Simulator (HFSS) simulation model for an embodiment of the present invention that consists of a loop antenna and a probe.
Figure 17:
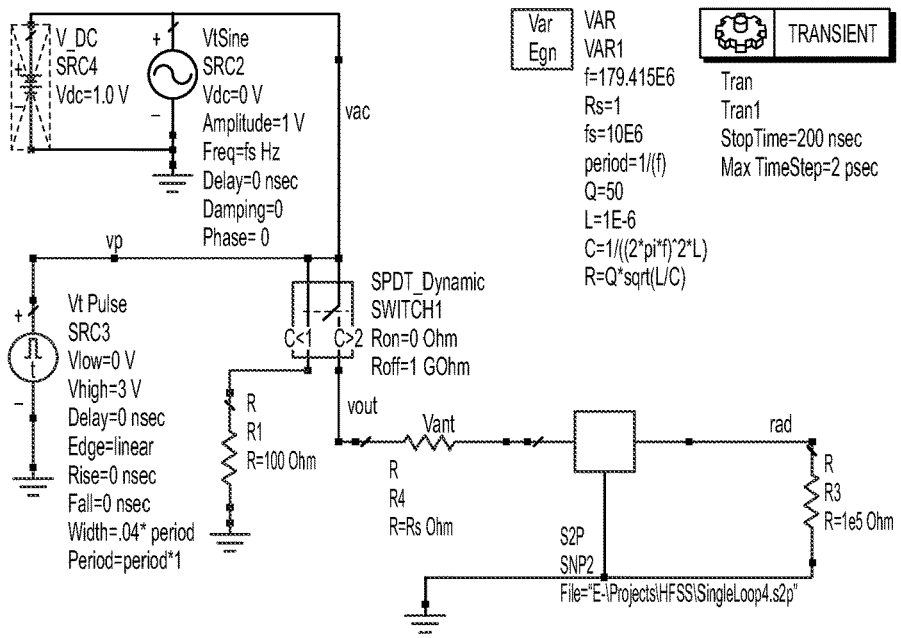
FIG. 17 illustrates an ADS simulation based on a two port simulation from HFSS. The first port is connected to the loop antenna and the second port is connected to a short dipole as a probe located 20 cm above the antenna.

FIG. 16 shows the simulation model for the HFSS. This simulation consists of two ports, $p_1$ and $p_2$, which are connected to the loop and short dipole antennas respectively. The scattering matrix of this structure was imported to an Advanced Design System (ADS) circuit simulator to study the switching effects. FIG. 17 shows the transient simulation model with a sinusoidal voltage source which acts as a charge pump. The switching signal was not locked to the RF signal and, as a result, it may increase the harmonics due to improper switching moments. Charge pumps may also be used with the switches without clock recovery and feedback, which is similar to the example demonstrated in FIG. 17.

Figure 18A:
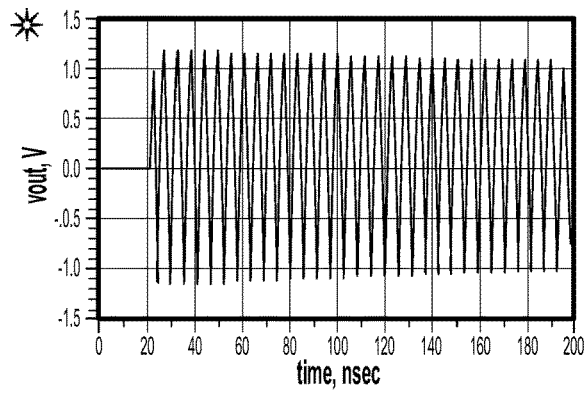
FIGS. 18A-18B illustrate an impulse response of an antenna of an embodiment of the present invention. (A) Voltage across the capacitor in the antenna structure after an impulsive charge pump. (B) Detected signal at the location of the probe.
Figure 18B:
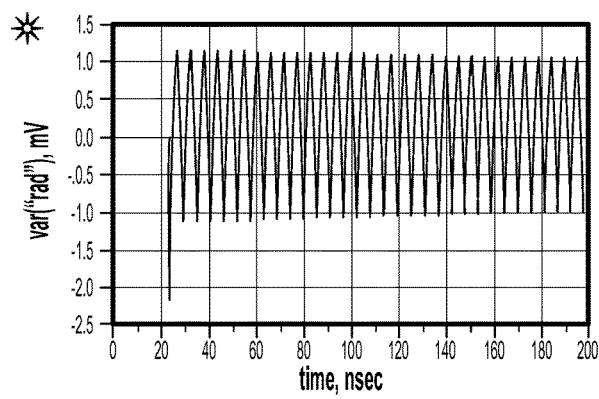

The antenna impulse response and the radiated field detected by the short probe are shown in FIGS. 18A and 18B. As may be observed from these figures, the antenna maintains a small decay which is a sign of small damping factor or narrow bandwidth. The same simulation has been used to radiate a 10 MHz signal from the loop antenna and have it detected by the probe antenna. The results are depicted in the FIGS. 19A-19D.

Figure 19A:
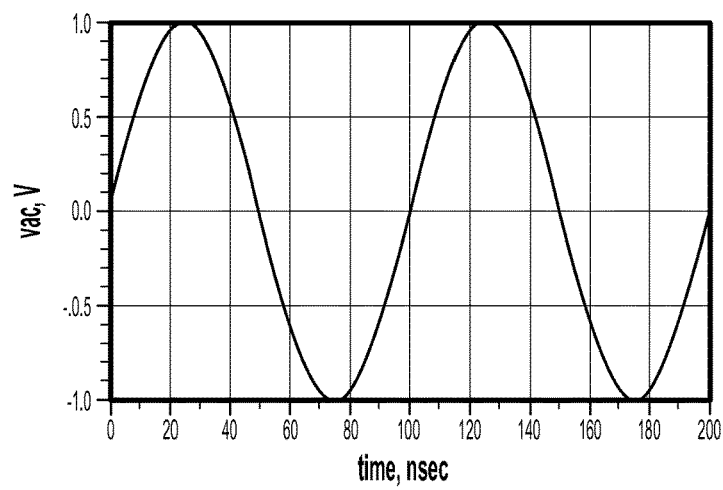
FIGS. 19A, 19B, 19C and 19D: illustrate an input and radiated waveforms for an embodiment of the present invention. (A) Input signal is a 10 MHz sinusoidal, (B) the voltage across the antenna port, (C) radiated waveform detected by the probe, (D) spectrum of the radiated field.
Figure 19B:
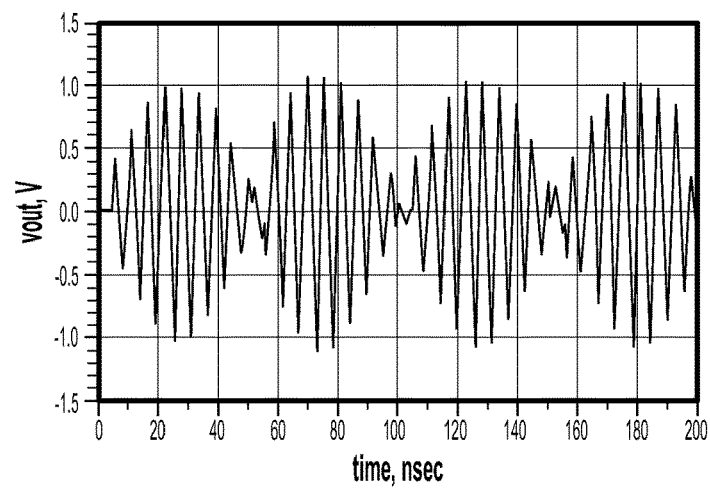
Figure 19C:
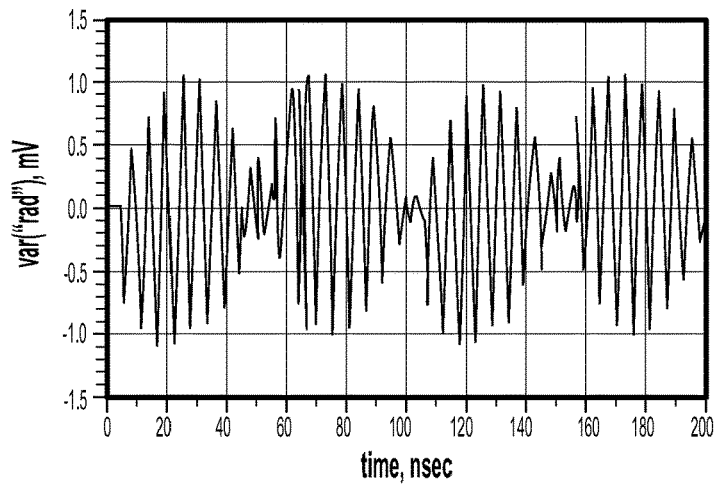
Figure 19D:
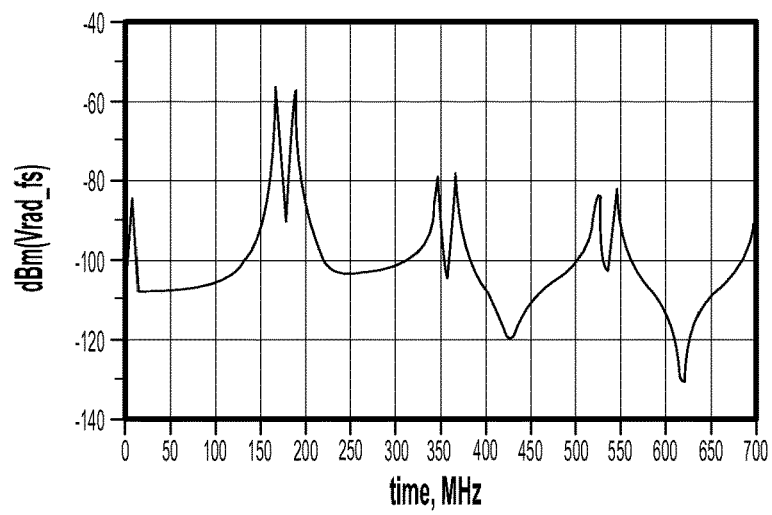

Since the switching signal is not synchronized to the antenna signal, many of the $\pm\Delta V$ have not been applied at the corrected timing, therefore the frequency domain response presented in FIG. 19D shows some harmonics which are 20 dB below the radiated signal. The main reason that the received signal is very small is due to the fact that the probe antenna is not at resonant length and it is not matched to its impedance as well. This probe was used to determine if the antenna is radiating and to determine the waveform of the radiated signal. The bandwidth of the radiated signal is 20 MHz (double sideband) which is 227 times wider than the antenna bandwidth.

As set forth above, small antennas in general converge to three different cases: type 1—electric dipole (or magnetic loop), type 2—magnetic dipole (or electric loop), or type 3 which is a combination of electric and magnetic dipoles. It has also been shown that the charged pumped antenna only radiates a double sideband signal at its current topology. Almost all the current radios transmit and receive single sideband signals. Therefore, to make the antenna embodiments of the present invention practical for current demands, the ability to transmit a single sideband signal is desired.

Figure 20:
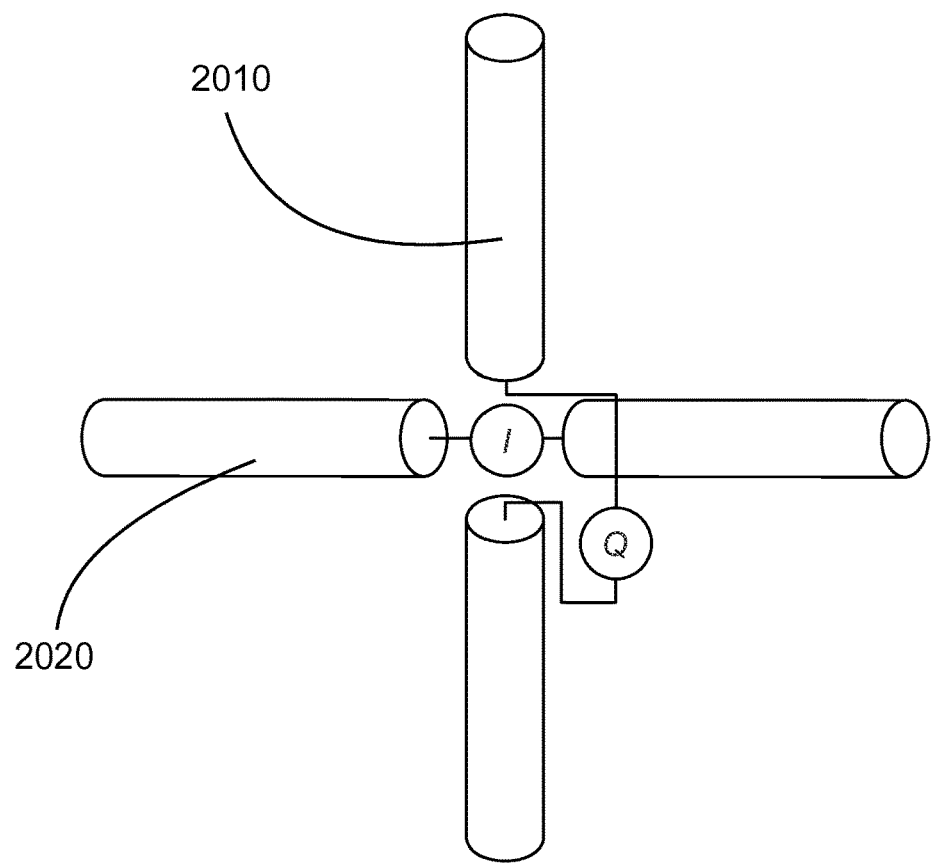
FIG. 20 depicts transmitting a circular polarized single sideband signal using orthogonal dipoles for an embodiment of the present invention.

To accomplish this, as shown in FIG. 20, two orthogonal dipoles 2010 and 2020 may be provided. One may be fed with in-phase, I, and the other with quadrature-phase, Q, to radiate a circular polarized signal. The radiated signal will be a single sideband. FIG. 20 shows the topology for this application.

The I/Q signals are related as:

$$\sin(2\pi ft+\varphi(t))=\sin(2\pi ft)\cos[\varphi(t)]+\cos(2\pi ft)\sin[\varphi(t)]$$
$$=I+Q$$

$$E_x=I=\sin(2\pi ft)\cos[\varphi(t)] \text{ and } E_y=Q=\cos(2\pi ft)\sin[\varphi(t)]$$

$$E=(\sin(2\pi ft)\cos[\varphi(t)], \cos(2\pi ft)\sin[\varphi(t)])$$

This equation shows that the transmitted field will be circularly polarized and a single sideband.

In yet another embodiment, the present invention provides an electrically small device configured to radiate wideband signals The device may include a tunable high Q narrowband antenna having a plurality of ports including at least one feed port and at least one tuning port as well as a tuning element coupled to the tuning port of the antenna. One or more voltage sources may be used to supply energy to the antenna for radiating a radio frequency signal. A modulating signal generator may also be provided for generating a high data rate signal coupled at the tuning element for modulating the tuning element. In other aspects, the tuning element comprises at least one variable reactive component and the variable reactive component may comprise one or more of a capacitor, an inductor, and a resistor element.

In yet other aspects, the voltage source may be coupled to the feed port of the antenna and supplies a continuous wave (CW) radio frequency signal and/or the voltage source is coupled to the feed port and supplies a variable radio frequency signal. The tuning element may further comprise a plurality of capacitors coupled to the tuning port of with a plurality of switches. In addition, a modulating signal generator that controls the switches at the tuning element according to a high data rate signal for modulating the tuning element may be used.

The plurality of switches may further alternately couple the voltage source to the plurality of capacitors and the plurality of switches may couple the plurality of capacitors to the tuning port of the antenna with a modulating signal generator controlling the plurality of switches according to a high data rate signal for modulating the tuning element while supplying energy to the antenna for radiating a radio frequency signal.

In yet other aspects, the voltage source comprises a variable radio frequency source for supplying energy to the antenna. A modulating signal generator may further control the variable radio frequency source according to a high data rate signal for modulating the energy to the antenna for radiating the radio frequency signal. Lastly, the plurality of ports may be further coupled to a variable radio frequency source to further control the variable radio frequency source supplying energy to the antenna for radiating the radio frequency signal.

In yet other aspects, the present invention concerns an electrically small device configured to radiate wideband signals. The device includes a tunable high Q narrowband antenna having a plurality of ports including a feed port and a tuning port, a variable reactive tuning element comprising at least a capacitive element coupled to the tuning port of said antenna, a voltage source for supplying energy to the antenna for radiating a radio frequency signal, wherein the voltage source is coupled to the feed port of said antenna, and a modulating signal generator for generating a high data rate signal coupled at the tuning element for modulating the tuning element.

In other embodiments, the voltage source supplies a continuous wave (CW) radio frequency signal or a variable radio frequency signal. The tuning element may be a plurality of capacitors coupled to the tuning port of the antenna by a plurality of switches. In addition, the modulating signal generator may be configured to control the plurality of switches at the tuning element according to a high data rate signal for modulating the tuning element.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. An electrically small device configured to radiate wideband signals, comprising:
    a tunable high Q narrowband antenna having a plurality of ports including a feed port and a tuning port;
    a tuning element coupled to the tuning port of said antenna;
    a voltage source supplying energy to said antenna for radiating a radio frequency signal;
    a modulating signal generator for generating a high data rate signal coupled at the tuning element for modulating the tuning element;
    said tuning element comprises a plurality of capacitors coupled to the tuning port of said antenna with a plurality of switches; and
    said plurality of switches alternately couple said voltage source to the plurality of capacitors and said plurality of switches couple said plurality of capacitors to the tuning port of said antenna with a modulating signal generator controlling the plurality of switches according to a high data rate signal for modulating the tuning element while supplying energy to said antenna for radiating the radio frequency signal.

2. The device of claim 1, wherein the tuning element comprises at least one variable reactive component.

3. The device of claim 2, wherein the variable reactive component comprises one or more of a capacitor, an inductor, and a resistor element.

4. The device of claim 1, wherein the voltage source is coupled to the feed port of said antenna and supplies a continuous wave (CW) radio frequency signal.

5. The device of claim 1, wherein the voltage source is coupled to the feed port of said antenna and supplies a variable radio frequency signal.

6. The device of claim 1, further including a modulating signal generator that controls said plurality of switches at the tuning element according to a high data rate signal for modulating the tuning element.

7. An electrically small device configured to radiate wideband signals, comprising:
    a tunable high Q narrowband antenna having a plurality of ports including a feed port and a tuning port;
    a tuning element coupled to the tuning port of said antenna;
    a voltage source supplying energy to said antenna for radiating a radio frequency signal;
    a modulating signal generator for generating a high data rate signal coupled at the tuning element for modulating the tuning element;
    said voltage source comprises a variable radio frequency source for supplying energy to said antenna; and
    said modulating signal generator further controls the variable radio frequency source according to a high data rate signal for modulating the energy to said antenna for radiating the radio frequency signal.

8. The device of claim 7, wherein the tuning element comprises at least one variable reactive component.

9. The device of claim 8, wherein the variable reactive component comprises one or more of a capacitor, an inductor, and a resistor element.

10. The device of claim 7, wherein the voltage source is coupled to the feed port of said antenna and supplies a continuous wave (CW) radio frequency signal.

11. The device of claim 7, wherein the voltage source is coupled to the feed port of said antenna and supplies a variable radio frequency signal.

12. The device of claim 7, further including a modulating signal generator that controls said plurality of switches at the tuning element according to a high data rate signal for modulating the tuning element.

13. An electrically small device configured to radiate wideband signals, comprising:
    a tunable high Q narrowband antenna having a plurality of ports including a feed port and a tuning port;
    a tuning element coupled to the tuning port of said antenna;
    a voltage source supplying energy to said antenna for radiating a radio frequency signal;
    a modulating signal generator for generating a high data rate signal coupled at the tuning element for modulating the tuning element;
    said voltage source comprises a variable radio frequency source for supplying energy to said antenna; and
    said one of the plurality of ports of said antenna is further coupled a variable radio frequency source to further control the variable radio frequency source supplying energy to said antenna for radiating the radio frequency signal.

14. The device of claim 13, wherein the tuning element comprises at least one variable reactive component.

15. The device of claim 14, wherein the variable reactive component comprises one or more of a capacitor, an inductor, and a resistor element.

16. The device of claim 13, wherein the voltage source is coupled to the feed port of said antenna and supplies a continuous wave (CW) radio frequency signal.

17. The device of claim 13, wherein the voltage source is coupled to the feed port of said antenna and supplies a variable radio frequency signal.

18. The device of claim 13, further including a modulating signal generator that controls said plurality of switches at the tuning element according to a high data rate signal for modulating the tuning element.

19. A method of radiating wideband high data rate radio frequency signals, comprising:
   providing a tunable high Q narrowband antenna with a plurality of ports including a feed port and a tuning port;
   coupling a tuning element to the tuning port of said antenna;
   supplying a voltage source for radiating radio frequency signal energy from said antenna;
   generating a high data rate signal coupled at the tuning element for modulating the tuning element with a modulating signal generator;
   providing the tuning element with a plurality of capacitors coupled to the tuning port of said antenna with a plurality of switches; and
   said plurality of switches alternately couple the voltage source to the plurality of capacitors and said plurality of switches couple the plurality of capacitors to the tuning port of said antenna with the modulating signal generator controlling the plurality of switches according to the high data rate signal for modulating the tuning element while supplying energy to said antenna for radiating the radio frequency signal.

20. The method of claim 19, further providing the tuning element with a plurality of capacitors coupled to the tuning port of said antenna through a plurality of switches; and controlling the plurality of switches at the tuning element with a modulating signal generator according to a high data rate signal for modulating the tuning element.

* * * * *